(12) United States Patent
Kobayashi

(10) Patent No.: US 7,354,206 B2
(45) Date of Patent: Apr. 8, 2008

(54) LENS-BARRIER DEVICE FOR CAMERA

(75) Inventor: Hideo Kobayashi, Saitama (JP)

(73) Assignee: Fujinon Corporation, Saitama (JP)

( * ) Notice: Subject to any disclaimer, the term of this patent is extended or adjusted under 35 U.S.C. 154(b) by 244 days.

(21) Appl. No.: 11/086,312

(22) Filed: Mar. 23, 2005

(65) Prior Publication Data
US 2005/0213961 A1     Sep. 29, 2005

(30) Foreign Application Priority Data
Mar. 23, 2004   (JP) ............. 2004-084922

(51) Int. Cl.
G03B 17/00 (2006.01)
H04N 5/225 (2006.01)
G02B 23/16 (2006.01)
(52) U.S. Cl. .............. 396/448; 348/373; 359/511
(58) Field of Classification Search ............... 396/448, 396/349, 348; 348/373–375; 359/511
See application file for complete search history.

(56) References Cited

U.S. PATENT DOCUMENTS 5,737,658 A * 4/1998 Arai ..................... 396/448
6,254,289 B1 * 7/2001 Manabe et al. ............ 396/448
6,334,718 B1 * 1/2002 Akiba et al. ............... 396/448
2005/0053372 A1 * 3/2005 Hase ......................... 396/448

FOREIGN PATENT DOCUMENTS

JP    2000-111973 A    4/2000

* cited by examiner

*Primary Examiner*—Melissa Jan Koval
(74) *Attorney, Agent, or Firm*—Young & Thompson

(57) ABSTRACT

A lens barrier is held in an open position by a first coil spring while the camera remains electrically powered. When a power switch is turned off, a taking lens retracts within a camera body, and a barrier drive gear is rotated by a motor to extend a second coil spring so as to force the lens barrier to move to a closed position from the open position at the moment that tensile force of the second coil spring rises beyond that of the first extension spring. When the lens barrier is completely moved to and stops in the closed position, the camera is disconnected from power.

4 Claims, 6 Drawing Sheets

LENS-BARRIER DEVICE FOR CAMERA

BACKGROUND OF THE INVENTION

1. Field of the Invention

The present invention relates to a lens-barrier device for a camera having a lens barrier movable between a closed position for protecting a taking lens and an open position for exposing the taking lens.

2. Description of Related Art

There have been known cameras provided with a lens-barrier that automatically covers a taking lens for protection when a power switch is turned off. Such a camera such as disclosed in, for example, Japanese Unexamined Patent Publication No. 2000-111973, is equipped with a lens-barrier drive mechanism that drives a lens barrier through a buffering mechanism. The buffering mechanism converts a rotational movement of a ring gear capable of rotating around a stationary lens barrel of a zoom lens into a linear movement with which the lens barrier is driven and, on the other hand, absorbs external force so as to prevent a drive system of the buffering mechanism from being damaged.

Since the buffering mechanism is usually installed in the close vicinity of a rotational axis of the lens barrier, it is absolutely required to make a space for installation of the lens barrier in the vicinity of the rotational axis near a front end portion of the lens barrel. This requirement unavoidably increases a size of the lens barrel and, in consequence, results in a large-sized camera body and a decrease in the degree of freedom for camera design.

SUMMARY OF THE INVENTION

It is therefore an object of the present invention to provide a lens-barrier device for a camera which is contributive to compactness of the camera and, on the other hand, enables enhancement of the degree of design freedom.

The foregoing object is accomplished by a lens-barrier device for a camera which is equipped with a taking lens protruding from and retracting within a camera body through an aperture formed in a front cover of the camera body and a power switch for powering the camera and disconnecting the camera from power for protecting the taking lens retracted within the camera body. The lens-barrier device comprises a lens barrier movable between an closed position where covering the aperture and an open position where uncovering the aperture, a first tension spring for urging the lens barrier toward the open position when extended, a second tension spring for urging the lens barrier to the closed position when extended that has a tensile strength greater than the first tension spring, rotatable urging means for extending the second tension spring so as thereby to urge the lens barrier to the closed position against the first tension spring when rotating in one of opposite directions and allowing the first and second tension springs to restore so as thereby to urge the lens barrier to the open position when rotating in another direction, and electrically operated drive means such as a reversible motor for rotating the rotatable urging means in the one direction when the power switch is operated to power the camera and in the other direction when the power switch is operated to disconnect the camera from power. It is preferred to keep the camera continuously powered for a certain period of time even after operating the power switch so as to cause necessary motion for closing the lens barrier in that period of time.

According to the configuration of the lens-barrier device, since the lens barrier is opened and closed through an interaction between two extension springs by varying tensile force of one of the two extension springs through the rotatable urging means such as a rotatable arm that has a center of rotation located out of a path of movement of the lens barrier between the open and closed positions, the lens-barrier device has no need to provide a buffering mechanism near a lens barrel, so that it allows compact design of the camera body around the lens barrel, and hence the degree of freedom for camera design.

Moreover, since rotatable arm is adapted to work as a magnifier for magnifying input movement to one of opposite ends thereof into expanded movement at the other end thereof, closing motion of the lens barrier is secured with small movement, and guaranteed protection of the taking lens is implemented. The lens barrier movable between the bulging or raised front cover and the bulging or raised guide plate is installed within unique cameras having a bulging front exterior appearance.

BRIEF DESCRIPTION OF THE DRAWINGS

The foregoing and other objects and features of the present invention will be clearly understood from the following detailed description when reading with reference to the accompanying drawings, wherein the same reference signs have been used to denote same or similar parts throughout the drawings, and in which.

DETAILED DESCRIPTION OF THE PREFERRED EMBODIMENTS

Figure 1:
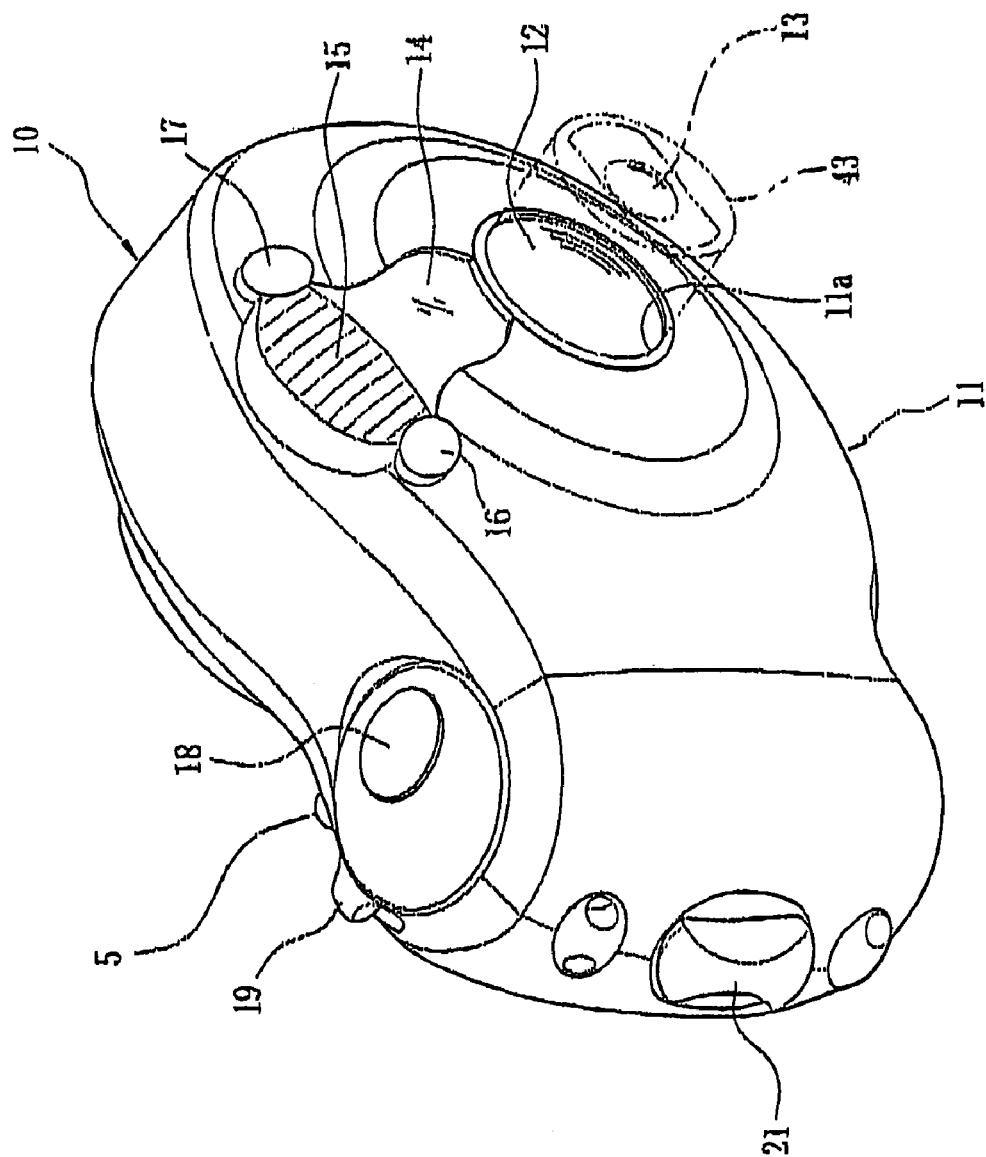
FIG. 1 is a perspective view of a camera equipped with a lens-barrier device in accordance with an embodiment of the present invention.

Referring to the accompanying drawings in detail, and in particular, to FIG. 1 schematically showing a camera equipped with a lens-barrier device according to an embodiment of the present invention, a camera 10 has an overall rounded body that is covered by a front cover 11 with a circular ingress/egress aperture 11a formed at its center. The front cover 11 is provided with the circular ingress/egress aperture 11a formed at its center, a finder window 14 formed above the circular ingress/egress aperture 11a, a diffusion plate 15 forming a part of a built-in electronic flash (not shown), and windows 16 and 17 forming a part of an automatic focusing device which are disposed on opposite sides of the diffusion plate 15. The camera 10 has an inner lens barrier 12 installed behind the front cover 11 and a zoom lens 13 including at least a movable lens barrel 43 which is disposed behind the inner lens barrier 12. The lens barrier 12 remains closing the circular ingress/egress aperture 11a of the front cover 11 while the camera 10 is out of service, in other words, while a power switch 5 remains off. The front cover 11 and inner lens barrier 12 are gently raised in conformity with the rounded body.

The camera is further provided with a shutter button 18 disposed in its top wall of the camera body, a zoom lever 19 installed in its upper rear wall of the camera body for varying a focal length of the zoom lens 13, and an operating knob 21 installed in a side wall of the camera body for opening a bottom lid 20 (see FIG. 5) of a film chamber which receives a film cartridge therein. The film cartridge is of what is called an IX240 type that is smaller in overall size than a 135 type film cartridge.

Figure 2:
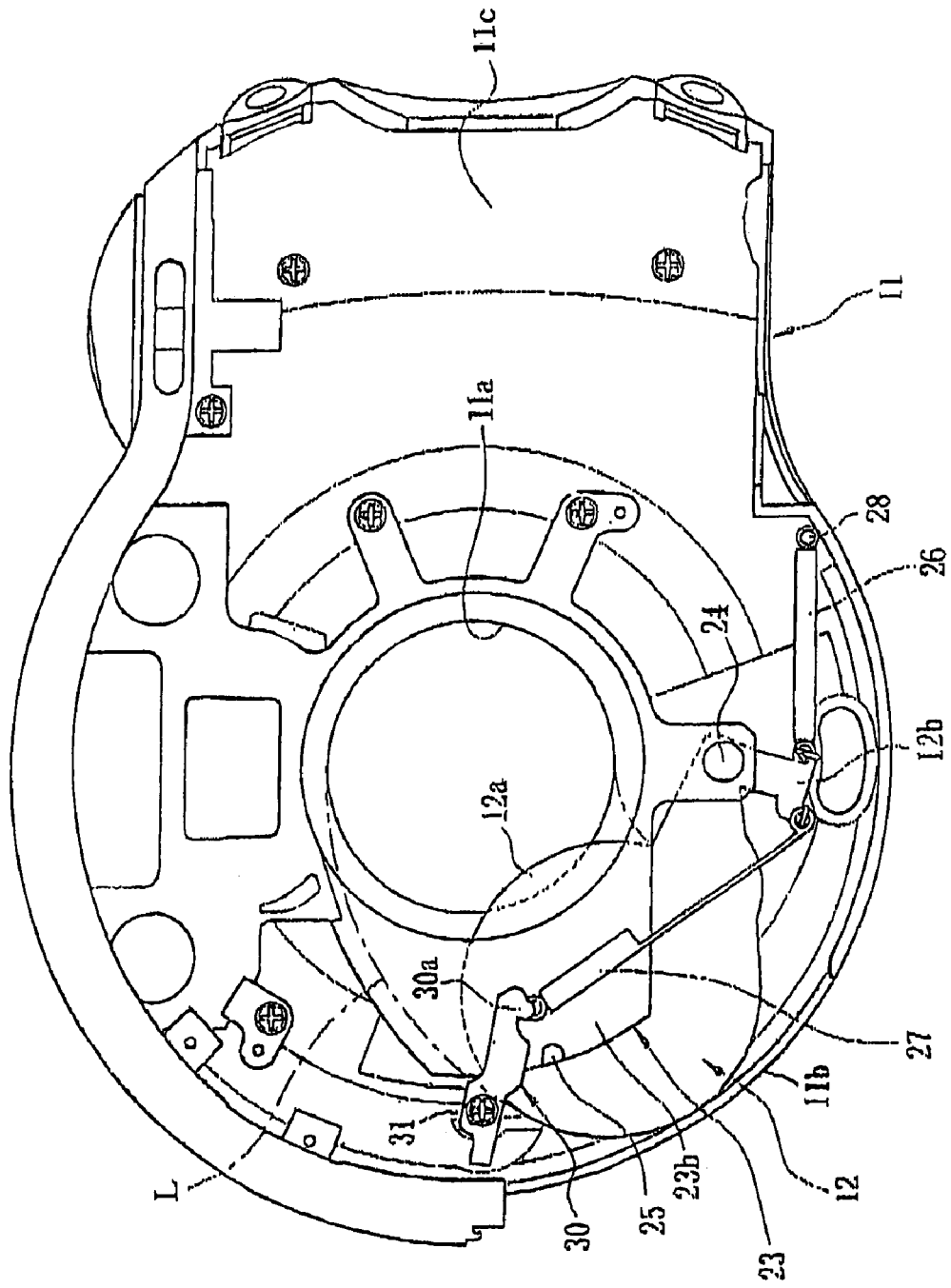
FIG. 2 is a schematic view of a lens-barrier device in an open position as viewed from the back.
Figure 3:
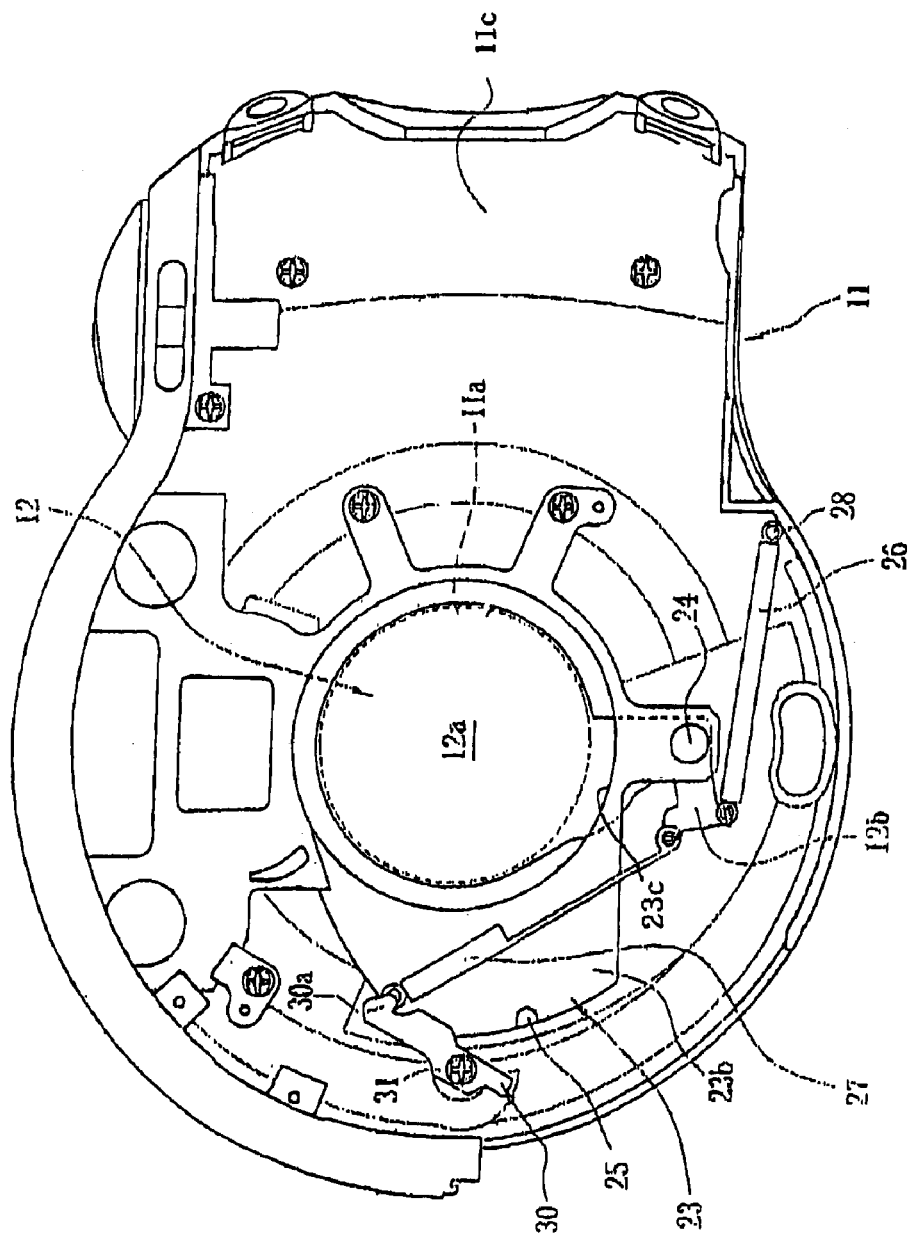
FIG. 3 is a schematic view of the lens-barrier in a closed position as viewed from the back.
Figure 4:
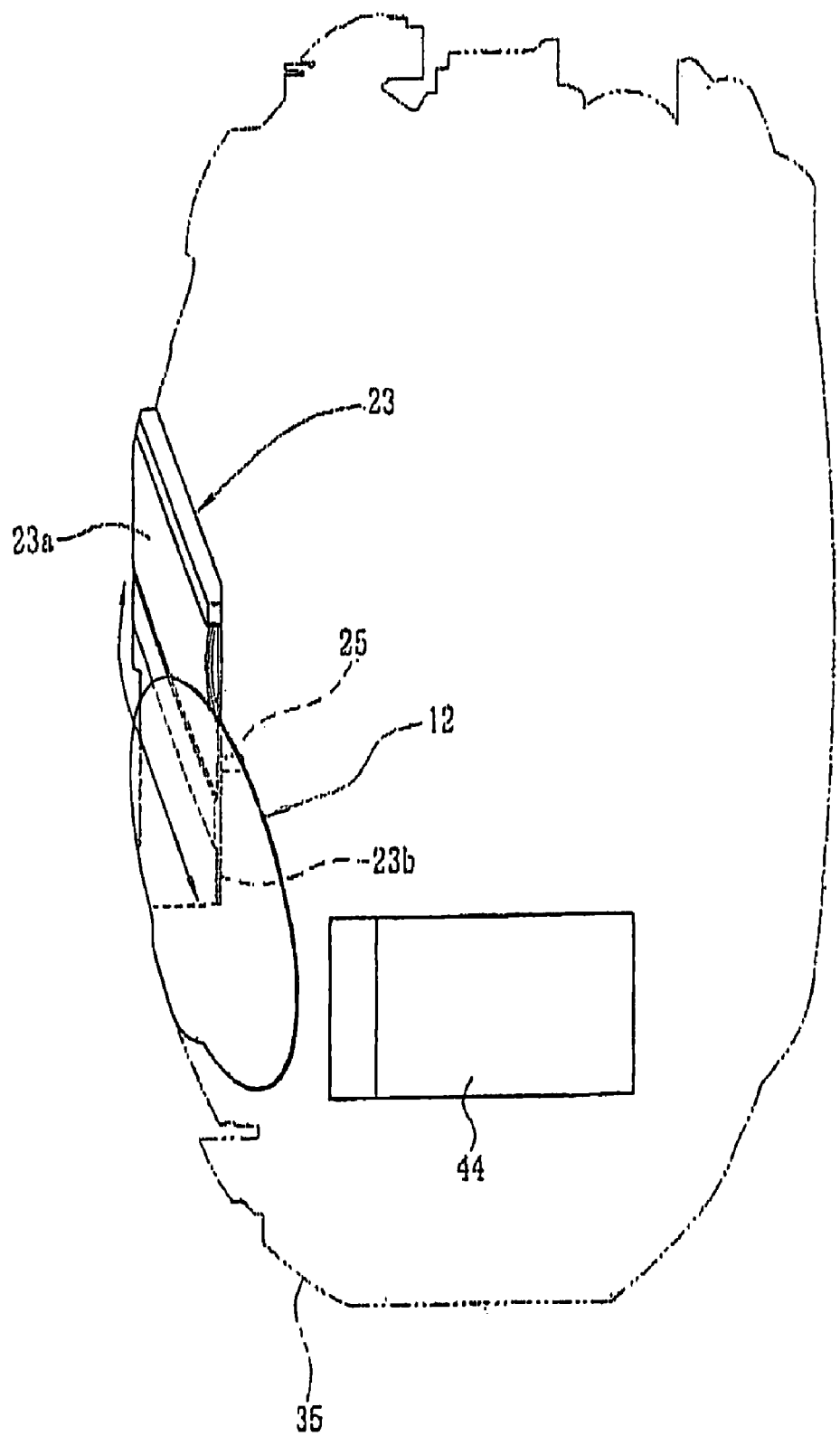
FIG. 4 is a perspective side view of the lens-barrier device relative to a guide plate.

Referring to FIGS. 2 and 3 showing an internal structure behind the front cover 11, the lens barrier 12 is pivotally mounted on a pivot shaft 24 fixed between the front cover 11 (a back surface 11b) and a stationary guide plate 23 having a front surface 23a raised or bulged in conformity with the bulgy front cover 11 as shown in FIG. 4 and a rear surface 23b. There is an axial space left between the front cover 11 and the stationary guide plate 23 so as to allow the lens barrier 12 to move between them. The guide plate 23 has a circular aperture 23c larger than the circular ingress/egress aperture 11a of the front cover 11 formed therein and is provided with a stopper pin 25 for restriction of swinging movement of a barrier actuator arm 30 pivotally mounted on a shaft 31 fixed to the front cover 11 (see FIGS. 5 and 6) which will be described later. The lens barrier 12 comprises an integral piece including a circular portion 12a raised or bulged in conformity with the bulgy front cover 11 for closing the circular ingress/egress aperture 11a of the front cover 11, a crooked claw portion 12b.

The lens-barrier device is made up of the lens barrier 12 and a barrier drive mechanism including first and second extension springs 26 and 27, such as piano wire coil springs, a barrier drive gear 51. The first extension spring 26 is mounted between the claw portion 12b of the lens barrier 12 and a stationary part, such as a boss 28, of the front cover 11 so as to urge the lens barrier 12 in a counterclockwise direction, i.e. toward an open position where the lens barrier 12 uncovers or opens the ingress/egress aperture 11a. The second extension spring 27 is mounted between the claw portion 12b of the lens barrier 12 and a distal end 30a of the barrier actuator arm 30 so as to urge the lens barrier 12 in a clockwise direction, i.e. toward a closed position where the lens barrier 12 covers or closes the ingress/egress aperture 11a. These first and second extension springs 26 and 27 are such that the second extension spring 27 has a spring tension greater than the first extension spring. Specifically, when the barrier actuator arm 30 is turned in a counterclockwise direction while the lens barrier 12 is in the open position, the second extension spring 27 tows and gradually expands the first extension spring 26, so as thereby to force the lens barrier 12 in a clockwise direction from the open position toward the closed position. When the lens barrier 12 is fully brought into the closed position, the second extension spring 27 is slightly expanded charging a compressive force until the barrier actuator arm 30 is retained in a specified position. On the other hand, when the barrier actuator arm 30 is released, the second extension spring 27 immediately rebounds to its original state and allows the first extension spring 26 to be restored to its original state towing the lens barrier 12 in a counterclockwise direction to the open position. The first extension spring 26 keeps the lens barrier 12 in the closed position unless the lens barrier 12 receives an external force in a clockwise direction against the second extension spring 26. It is preferred that the first and second extension springs 26 and 27 are made of a piano wire and that the piano wire for the second extension spring 27 is thicker than that for the first extension spring 26. In this instance, the shaft 31 of the barrier actuator arm 30 is positioned far away from the zoom lens 13 and out of a path of movement L of the lens barrier 12 so as thereby not only to realize a compact structure around the zoom lens 13 but also to enhance the degree of freedom for camera design. Further, the barrier actuator arm 30 works as a magnifier for magnifying force applied to a working point, namely one of opposite proximal ends 30b, or movement of the working point as amplified reaction force or movement at the other proximal end 30a.

Figure 5:
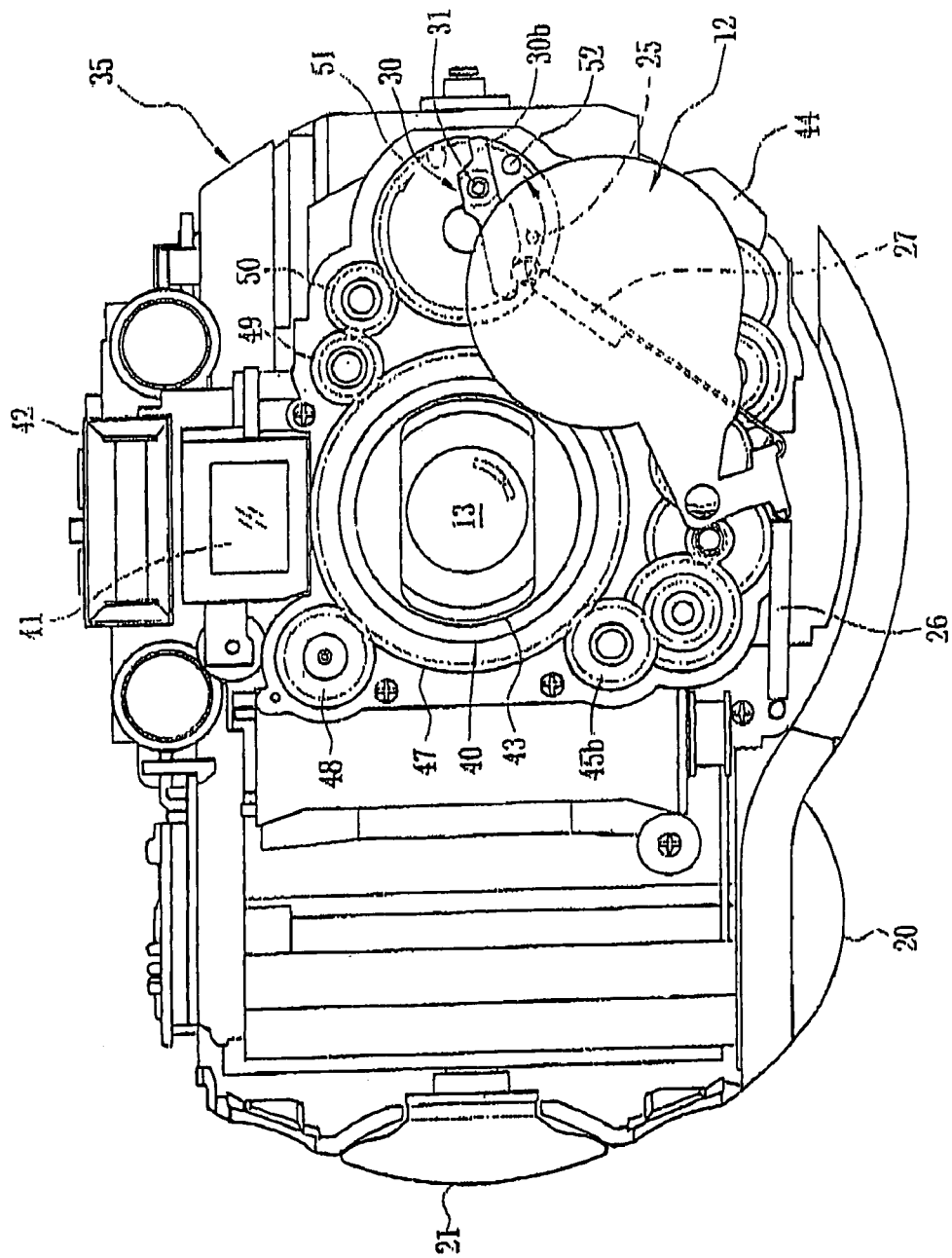
FIG. 5 is a front view of the lens-barrier device with the lens barrier in the open position.
Figure 6:
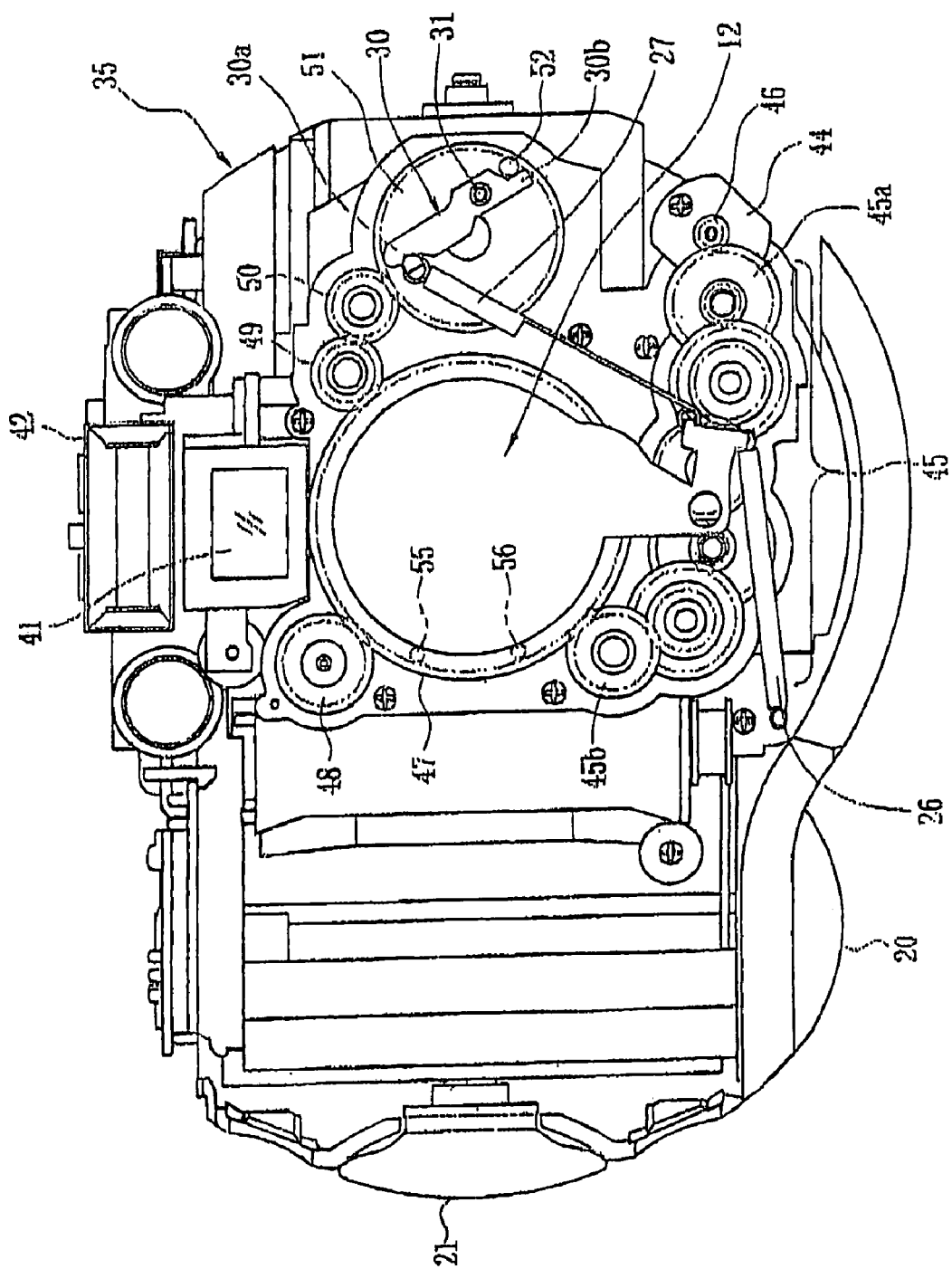
FIG. 6 is a front view of the lens-barrier device with the lens barrier in the closed position.

Referring to FIGS. 5 and 6 showing an internal structure of the camera 10 with the front cover 11 removed, the camera 10 is equipped with the zoom lens 13 having a stationary lens barrel 40 fixedly mounted to a central portion of the camera body 35, and a zoom finder system 41 and an electronic flash unit 42 both of which are built in the camera body 35 above the stationary lens barrel 40 of the zoom lens 13. Further, the camera 10 is equipped with a drive motor 44 disposed below the stationary lens barrel 40 of the zoom lens 13 and a reduction gear train 45 arranged between the drive motor 44 and a ring gear 47 mounted on the stationary lens barrel 40 of the zoom lens 13 so as to work as a governor to reduce and transmit rotation of the drive motor 44 to the ring gear 47. The drive motor 44 has a pinion gear 46 as an output gear. The reduction gear train 45 includes at least an input gear 45a in engagement with the output gear 46 of the drive motor 44, and an output gear 45b in engagement with the ring gear 47 mounted on the stationary lens barrel 40 of the zoom lens 13.

The ring gear 47 interlocks a mechanical motion of the zoom lever 19 with the zoom finder 41 and the barrier drive gear 51. Specifically, the camera 10 is provided with interlocking gears 48 and 49 in engagement with the ring gear 47 and an interlocking gear 50 in engagement with both interlocking gear 49 and barrier drive gear 50. The interlocking gear 48 transmits rotation of the ring gear 47 to the zoom finder system 41 so as to vary a field of view of the zoom finder system 41 correspondingly to a change in the focal length of the zoom lens 13. The interlocking gears 49 and 50 transmit rotation of the ring gear 47 to the barrier drive gear 51. The barrier drive gear 51, that is mounted to the front cover 11 for rotation, has a push pin 52 fixed thereto such that, when the front cover 11 is assembled to the camera body 35, the push pin 52 is put in a position where it is engageable with a proximal end 30b of the barrier actuator arm 30. As shown in FIG. 6, the guide plate 23 is provided with a pair of retaining pins 55 and 56 disposed with a certain separated and extending axially from the front surface 23a thereof. These retaining pins 55 and 56 abut against an outer periphery of the circular portion 12a of the lens barrier 12 so as thereby to retain the lens barrier 12 in the closed position. The barrier drive gear 51 is capable rotating in opposite directions, namely a counterclockwise direction as viewed in FIG. 6 which is referred to as an opening direction and a clockwise direction as viewed in FIG. 6 which is referred to as a closing direction.

The following description is directed to operation of the lens-barrier device shown in FIGS. 2 to 6. Before powering the camera 10, the zoom lens 13 is fully retracted within the camera body 35 behind the front cover 11 and protected by the lens barrier 12 closing the circular ingress/egress aperture 11a of the front cover 11. In this closed position, as shown in FIGS. 3 and 6, the push pin 52 of the barrier drive gear 51 in engagement with the proximal end 30b of the barrier actuator arm 30 keeps the barrier actuator arm 30 towing the second extension spring 27 in a clockwise direction and expanding the first extension spring 26 as shown in FIG. 6. That is to say, the barrier drive gear 51 keeps the lens barrier 12 abutting against the retaining pins 55 and 56 so that the lens barrier 12 is held in the closed position. Although the barrier actuator arm 30 is strongly pulled by the second extension spring 27 slightly expanded, the gear trains 49 counteracts as a governor so as thereby to prevent the drive motor 44 from rotating in a reverse direction and hence, to prevents the lens barrier 12 accidentally opening.

When turning the power switch 5 on to power the camera 10, a CPU (not shown) executes a programmed preparatory sequence for exposure. That is, as soon as turning the power switch 5 on, the drive motor 44 is activated. Rotation of the drive motor 44 is transmitted to the barrier drive gear 51 through the reduction gear train 49, the ring gear 47 and interlocking gears 49 and 50. When the drive motor 44 rotates in its normal direction, the barrier drive gear 51 is rotated in the opening direction, i.e. in a counterclockwise direction as viewed in FIG. 6, so as to allow the barrier actuator arm 30 to follow the push pin 52 of the barrier drive gear 51 by means of restoration of the second extension spring 27. As the second extension spring 27 contracts, then, the rotation in the opening direction of the barrier drive gear 51 allows the first extension spring 26 to contract through continuous movement of the barrier actuator arm 30 following the push pin 52 of the barrier drive gear 51. As a result, when the second extension spring 27 fully relaxes, then, the first extension spring 26 pulls the crooked claw portion 12b of the lens barrier 12 to force the lens barrier 12 in a clockwise direction toward the opening position, thereby gradually uncovering the circular ingress/egress aperture 11a of the front cover 11. When the first extension spring 26 contracts sufficiently enough to move the lens barrier 12 fully to the open position, the lens barrier 12 uncovers the circular ingress/egress aperture 11a of the front cover 11 and is held in the open position by an edge collar 11c (see FIG. 2) of the front cover 11. At this time, the barrier actuator arm 30 overshoots. However, the barrier actuator arm 30 strikes against the stopper pin 25 and bounces back a fraction from it, coming to rest out of touch with the stopper pin 25 as shown in FIG. 5.

When the ingress/egress aperture 11a is fully opened, the camera 10 extrudes the movable lens barrier 43 of the zoom lens 13 through the ingress/egress aperture 11a of the front cover 11 and then, is put prepared for exposure. In this prepared state, the zoom lens 13 is positioned at it shortest focal length, namely a wide angle end. When operating the zoom lever 19 right or left to alter the focal length of the zoom lens 13 as appropriate, the ring gear 47 rotates following axial and rotational movement of the movable lens barrel 43. Since the ring gear 47 interlocks a mechanical motion of the zoom lever 19 with the zoom finder 41 and the barrier drive gear 51, when operating the zoom lever 19 to vary the focal length of the zoom lens 13, rotation of the ring gear 47 is transmitted to the zoom finder system 41 through the interlocking gear 48 to vary the field of view and simultaneously to the barrier drive gear 51 through the interlocking gears 49 and 50. Then, the barrier drive gear 51 is caused to rotate in the clockwise direction. However, in this event, since the push pin 52 of the barrier drive gear 51 moves away from the barrier actuator arm 30 pulled by the second extension spring 27, the lens barrier 12 is kept in the closed position shown in FIG. 5.

When turning off the power switch 5 after completing intended shootings, the camera 10 activates the drive motor 44 to rotate in the reverse direction so as to move the zoom lens 13 to the wide angle end, i.e. a position for the shortest focal length, from a telephoto side and then to retract the movable barrel 43 within the camera body 35. The camera 10 keeps the drive motor 44 rotating in the reverse direction to rotate the barrier drive gear 51 in a clockwise direction as viewed in FIG. 5, so as thereby to turn the barrier actuator arm 30 through engagement of the push pin 52 with the proximal end 30b of the barrier actuator arm 30. In consequence, the barrier actuator arm 30 extends the second extension spring 27. As the barrier actuator arm 30 works as a magnifier, it causes a large expansion of the second extension spring 27 with a small movement of the proximal end 30b thereof. The second extension spring 27 increases tensile force acting on the claw portion 12b of the lens barrier 12 with an increase as it extends longer. At the moment that the second extension spring 27 increases its tensile force beyond that of the first extension spring 26, the lens barrier 12 is forced to strike the retaining pins 55 and 56 and stops in the closed position, so as thereby to close the ingress/egress aperture 11a of the front cover 11 of the camera body 35. When this series of camera motion is completed, the camera 10 is automatically disconnected from power.

In the event if the photographer gets his finger accidentally caught in the ingress/egress aperture 11a of the front cover 11 of the camera body 35 on the way of movement of the lens barrier 12 to the closed position from the open position, since the force that the lens barrier 12 exerts on the finger is differential tensile force between the first and second extension springs 26 and 27, there is no fear of injury to the finger, and besides, the lens barrier 12 is prevented from damaging the barrier drive system including the barrier actuator arm 30 and the barrier drive gear 51 through absorption of shocks caused due to a strike of the lens barrier 12 against the finger by the first and second extension springs 26 and 27.

The lens-barrier device of the present invention is not bounded by types of camera, such as the advanced photo system of cameras for use with IX240 type film cartridges, nor by types of taking lens such as a zoom lens as described above and maybe incorporated into conventional cameras equipped with an ordinary taking lens having a fixed focal length or digital cameras.

Although the present invention has been described in conjunction with a digital camera by way of embodiment, it is embodied in various electronic imaging systems including digital video cameras and cellular phones having image entry features. Further, various other embodiments and variants may occur to those skilled in the art, which are within the scope and spirit of the invention, and such other embodiments and variants are intended to be covered by the following claims.

What is claimed is:

1. A lens-barrier device for a camera which is equipped with a taking lens protruding from and retracting within a camera body through an aperture formed in a front cover of said camera body and a power switch for powering said camera and disconnecting said camera from power for protecting said taking lens retracted within said camera body, said lens-barrier device comprising:

a lens-barrier movable about a fixed axis between a closed position covering said aperture and an open position uncovering said aperture;

a first tension spring for urging said lens-barrier toward said open position;

a second tension spring having a tensile strength greater than said first tension spring for urging said lens-barrier to said closed position;

rotatable urging means for extending said second tension spring so as to urge said lens-barrier to said closed position against said first tension spring when rotating in one of opposite directions and allowing said first and second tension springs to restore so as thereby to urge said lens-barrier to said open position when rotating in another direction;

electrically operated drive means for rotating said rotatable urging means in said one direction when said power switch is operated to power said camera and in said other direction when said power switch is operated to disconnect said camera from power; and an arm fixed to said lens-barrier and extending from said axis in a direction away from said lens-barrier, said first and second tension springs being secured to said arm at a distance from said axis.

2. The lens-barrier device for a camera as defined in claim 1, wherein said rotatable urging means comprises a rotatable arm having a center of rotation located out of a path of movement of said lens-barrier between said open and closed positions.

3. The lens-barrier device for a camera as defined in claim 2, wherein said rotatable arm is pivotally mounted on a pivot shaft so as to work as a magnifier for magnifying movement of one of opposite ends of said rotatable arm that is caused by said electrically operated drive means into expanded movement of another end of said rotatable arm.

4. The lens-barrier device for a camera as defined in claim 1, wherein said electrically operated drive means, after rotating said rotatable urging means in said one direction, further protrudes said taking lens from said camera body when said power switch is operated to power said camera and retracts said taking lens within said camera body and thereafter rotates said rotatable urging means in said other direction when said power switch is operated to disconnect said camera from power.

* * * * *